(12) United States Patent
Hudson et al.

(10) Patent No.: US 8,999,008 B2
(45) Date of Patent: Apr. 7, 2015

(54) METHOD OF FORMING AN ELECTRODE ASSEMBLY

(75) Inventors: William Hudson, Oakland, CA (US);
Mohit Singh, Berkeley, CA (US);
Michael Geier, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 971 days.

(21) Appl. No.: 13/128,233

(22) PCT Filed: Nov. 6, 2009

(86) PCT No.: PCT/US2009/063655
§ 371 (c)(1),
(2), (4) Date: Jul. 22, 2011

(87) PCT Pub. No.: WO2010/054272
PCT Pub. Date: May 14, 2010

(65) Prior Publication Data
US 2012/0110835 A1    May 10, 2012

Related U.S. Application Data

(60) Provisional application No. 61/112,596, filed on Nov. 7, 2008.

(51) Int. Cl.
*H01M 10/0565* (2010.01)
*H01M 4/04* (2006.01)
*H01M 4/13* (2010.01)
*H01M 4/133* (2010.01)
*H01M 10/0585* (2010.01)
*H01M 10/38* (2006.01)

(52) U.S. Cl.
CPC ...... *H01M 10/0565* (2013.01); *Y10T 29/49108* (2013.01); *H01M 4/0404* (2013.01); *H01M 4/0411* (2013.01); *H01M 4/13* (2013.01); *H01M 4/133* (2013.01); *H01M 10/0585* (2013.01); *H01M 10/38* (2013.01); *Y02E 60/122* (2013.01)

(58) Field of Classification Search
CPC ..... H01M 4/0404–4/0414; H01M 4/36–4/366; H01M 4/02; H01M 4/13; H01M 4/0485; H01M 4/485; H01M 4/624; H01M 10/056; H01M 10/0565
See application file for complete search history.

(56) References Cited

U.S. PATENT DOCUMENTS 4,812,375 A    3/1989  Foster
4,879,190 A   11/1989  Lundsgaard
(Continued)

FOREIGN PATENT DOCUMENTS

WO          03012909 A1    2/2003

*Primary Examiner* — Alix Eggerding
(74) *Attorney, Agent, or Firm* — R'Sue Popowich Caron

(57) ABSTRACT

When electrode films are prepared for lithium electrochemical cells, problems are often encountered in laminating the films with an appropriate intervening electrolyte layer. This presents a significant challenge because proper alignment of the three layers and complete lamination at the interfaces are crucial to good cell performance. Often lamination is imperfect with gaps and defects at the interfaces. The disclosure herein describes a method of casting or extruding a polymer electrolyte directly onto an electrode film to create an electrode assembly with a continuous, defect-free interface. In some arrangements, there is some slight intermixing of the layers at the interface. A complete cell can be formed by laminating two such electrode assemblies to opposite sides of an additional electrolyte or to one another.

32 Claims, 12 Drawing Sheets

(56) References Cited

U.S. PATENT DOCUMENTS

| | | |
|---|---|---|
| 4,925,751 A | 5/1990 | Shackle |
| 5,013,619 A | 5/1991 | Cook |
| 5,354,631 A | 10/1994 | Chaloner-Gill |
| 5,453,101 A | 9/1995 | Ong |
| 5,643,665 A | 7/1997 | Saidi |
| 5,648,187 A | 7/1997 | Skotheim |
| 6,025,094 A | 2/2000 | Visco |
| 6,565,763 B1 | 5/2003 | Asakawa |
| 6,623,884 B1 * | 9/2003 | Spillman et al. ............... 429/94 |
| 6,743,550 B2 | 6/2004 | Gan |
| 6,828,056 B2 | 12/2004 | Molter |
| 7,026,071 B2 | 4/2006 | Mayes |
| 7,282,302 B2 | 10/2007 | Visco |
| 7,318,982 B2 | 1/2008 | Gozdz |
| 2002/0192548 A1 * | 12/2002 | Schaefer et al. ............... 429/209 |
| 2004/0013814 A1 | 1/2004 | Guerfi |
| 2004/0029010 A1 * | 2/2004 | Sada et al. ............... 429/231.4 |
| 2004/0122178 A1 * | 6/2004 | Huang et al. ............... 525/221 |
| 2004/0157130 A1 * | 8/2004 | Ohsawa et al. ............... 429/303 |
| 2006/0166093 A1 | 7/2006 | Zaghib |
| 2006/0228631 A1 * | 10/2006 | Miura et al. ............... 429/232 |
| 2006/0270822 A1 | 11/2006 | Norsten |
| 2007/0154805 A1 | 7/2007 | Zaghib |
| 2007/0238000 A1 * | 10/2007 | Koyama et al. ............... 429/33 |
| 2008/0138683 A1 | 6/2008 | Yoshikawa |
| 2010/0104948 A1 | 4/2010 | Skotheim |

* cited by examiner

# METHOD OF FORMING AN ELECTRODE ASSEMBLY

CROSS-REFERENCE TO RELATED APPLICATIONS

This application claims priority to U.S. Provisional Patent Application 61/112,596, filed Nov. 7, 2008 and to International Application No. PCT/US09/63655, filed Nov. 6, 2009, both of which are incorporated by reference herein. This application is also related to copending International Application No. PCT/US09/63643, filed Nov. 6, 2009 and to copending International Application No. PCT/US09/63653, filed Nov. 6, 2009 all of which are incorporated by reference herein.

BACKGROUND OF THE INVENTION

Field of the Invention

This invention relates generally to methods of forming a polymer layer seamlessly onto another layer, and, more specifically, to forming a solid polymer electrolyte layer on an electrode layer with continuous contact between the two.

The demand for rechargeable batteries is ever increasing as the global demand for portable consumer electronic products continues to grow. In addition, interest in rechargeable batteries has been fueled by current efforts to develop green technologies such as electrical-grid load leveling devices and electrically-powered vehicles, which are creating an immense potential market for rechargeable batteries with high energy densities. Thus, there has been much interest in lithium batteries as they have the highest specific energy (up to 180 Wh/kg) and energy density (up to 1050 Wh/L) among chemical and electrochemical energy storage systems.

Generally, individual components for a battery cell are each formed separately and then laminated together. An anode film is formed from anode active material particles, conductive carbon particles and binder. A cathode film is formed from cathode active material particles, conductive carbon particles and binder. The anode and cathode are aligned on either side of a separator layer, and the three components are pressed together (or stacked loosely). A liquid electrolyte is added to fill spaces within the anode, cathode, and separator to provide a continuous ion conduction path throughout the battery cell.

The increased demand for lithium secondary batteries has resulted in research and development to improve their safety and performance. Lithium batteries that employ liquid electrolytes are associated with a high degree of volatility, flammability, and chemical reactivity. With this in mind, the idea of using a solid electrolyte with a lithium-based battery system has attracted great interest.

When a battery cell is made with a solid electrolyte, the three major components of the cell are also formed separately. The anode film contains anode active material particles, conductive carbon particles, solid polymer electrolyte and, optional binder. The cathode film contains cathode active material particles, conductive carbon particles, solid polymer electrolyte and, optional binder. A polymer electrolyte (separator) layer is also formed. The anode and cathode films are aligned on either side of the polymer electrolyte layer, and the three components are laminated together to form a continuous ion conduction path through the battery cell. But the lamination process presents significant challenges when there is no liquid electrolyte to fill any gaps that may be formed during lamination. It is difficult to laminate three solid films together seamlessly. In most cases, lamination results in at least some gaps or defects at the interfaces. Such gaps and defects interfere with ion flow through the cell, increasing resistance to charging and discharging, which can have significant adverse effects on cell performance.

It would be useful to find a simple method for combining individual cell components together seamlessly in order to ensure that battery cells that use solid electrolytes are not hampered in their performance by poor lamination.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of joining battery cell component layers. The skilled artisan will readily appreciate, however, that the materials and methods disclosed herein will have application in a number of other contexts where ionic or electric conductivity between individual layers is desirable, particularly where solid electrolytes are used.

In accordance with one aspect of the present invention, the need described above can be met with a novel method of making battery cell components. A solid polymer electrolyte layer is cast directly onto an electrode layer, thereby forming an interface that is free of void space and defects and ensuring no interfacial impediments to ion conduction between the electrolyte and the electrode.

These and other objects and advantages of the present invention will become more fully apparent from the following description taken in conjunction with the accompanying drawings.

In this disclosure, the terms "negative electrode" and "anode" are both used to mean "negative electrode." Likewise, the terms "positive electrode" and "cathode" are both used to mean "positive electrode."

It is to be understood that the term "liquefied solid," as used herein in reference to electrolytes, is meant to denote a liquid form of a solid electrolyte wherein the liquid has been formed either through dissolution in a solvent or through melting. The "liquefied solid" is allowed to solidify by drying or cooling before an electrochemical cell is charged or discharged. Thus, when used in the cell, the electrolyte is a solid electrolyte. This term is used to distinguish such an electrolyte from commonly known liquid electrolytes, which participate in the electrochemical reactions of a cell in their liquid form.

Figure 1:
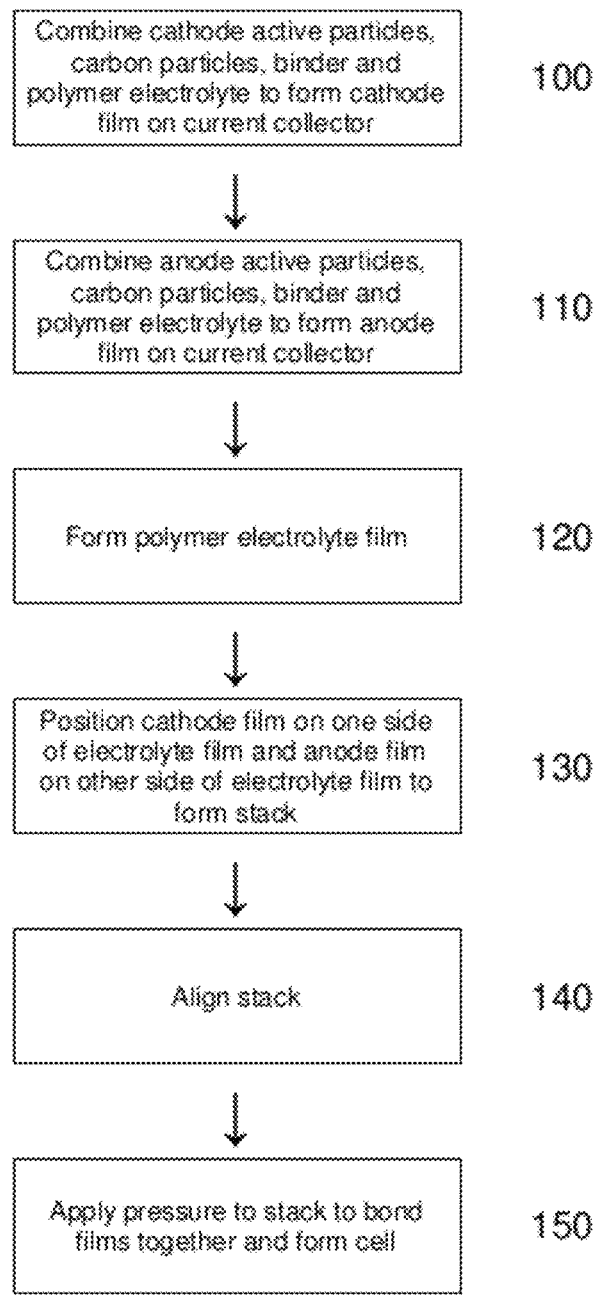
FIG. 1 is a flow chart that outlines the customary steps used in forming a battery cell.

Currently battery cell components are assembled into a cell using the steps outlined in FIG. 1. In step 100, cathode active particles, carbon particles, optional binder, and polymer electrolyte are combined together to form a cathode film on a metallic or other conductive substrate, which serves as a current collector. In step 110, anode active particles, carbon particles, optional binder, and polymer electrolyte are combined to form an anode film on a current collector. For some electrodes, a solid polymer electrolyte acts as a binder, so no additional binder is used. For other electrodes, a binder is used in addition to the polymer electrolyte. In step 120, a polymer electrolyte film is formed. In general, each of the films is formed either by casting or by extrusion. In step 130, the free-standing cathode, anode, and electrolyte films are arranged in a stack with the electrolyte film between the cathode and the anode films. In step 140 the stack is aligned to be sure that the maximum surface area of each film is available to the cell and to prevent the two electrodes from coming into physical contact and shorting the cell. In step 150, pressure and/or heat is applied to the stack to bond the layers together.

Figure 2:
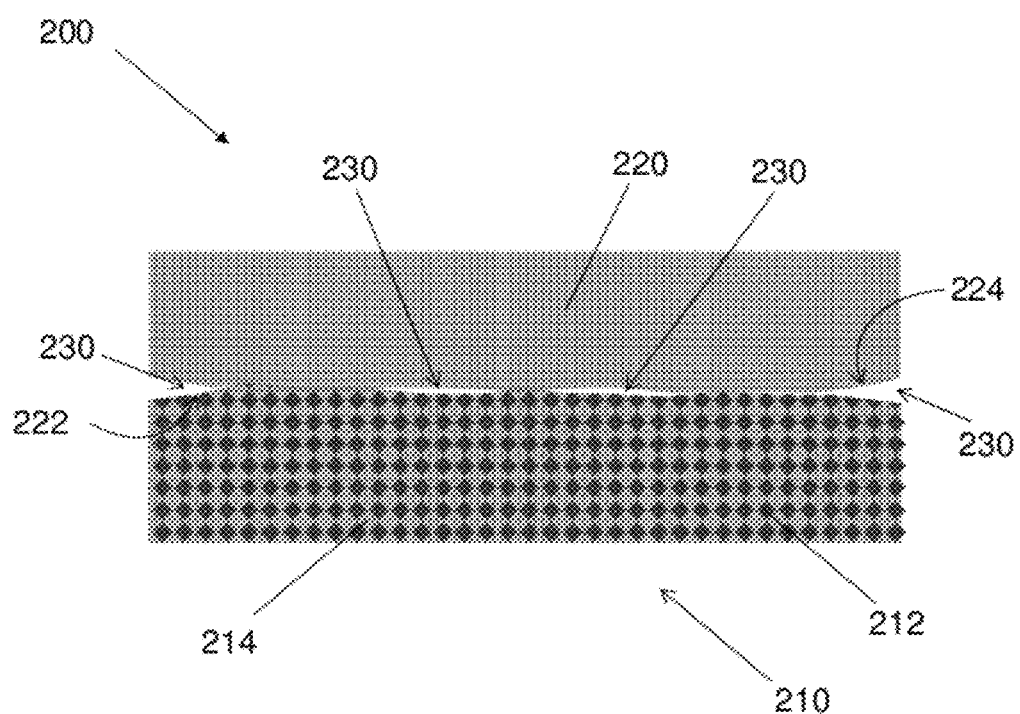
FIG. 2 is a schematic illustration of a solid polymer electrolyte layer laminated onto an electrode.

FIG. 2 is a schematic illustration that shows a problem that can occur when a cell is assembled according to the steps outlined in FIG. 1. A portion 200 of a cell, which includes an electrode film 210 and a solid polymer electrolyte layer 220 is shown. The electrode film 210 includes a variety of randomly distributed particles (shown collectively as black regions 212), such as electrode active particles, conductive carbon particles, and binder particles, all surrounded by solid polymer electrolyte (grey regions) 214. In this illustration, no porosity is shown, but some electrodes may contain pores. In most cases, surface 222 of the electrode film 210 is not perfectly flat, and surface 224 of the solid polymer electrolyte layer 220 is not perfectly flat. When the electrode film 210 and the solid polymer electrolyte layer 220 are pressed together, it is difficult to form a continuous, gap-free interface between the two layers because the layers are not soft, do not flow readily, and tend to retain their non-uniform surfaces. Most often gaps 230 are formed between the electrode film 210 and the solid polymer electrolyte layer 220. Each gap 230 is a region through which ions cannot flow between the electrode film 210 and the solid polymer electrolyte layer 220, thereby reducing the net ionic current that can flow through the cell, increasing cell resistance and resulting in poor performance during charge and discharge.

When liquid electrolytes are used, porous electrode films are laminated onto either side of a porous separator, and the entire assembly is filled with the liquid electrolyte and sealed. Thus, the liquid electrolyte fills any gaps that may result when electrodes are pressed onto the separator layer. As discussed above, no such filling in of gaps occurs when a solid electrolyte is used instead of the conventional liquid electrolyte.

Figure 3:
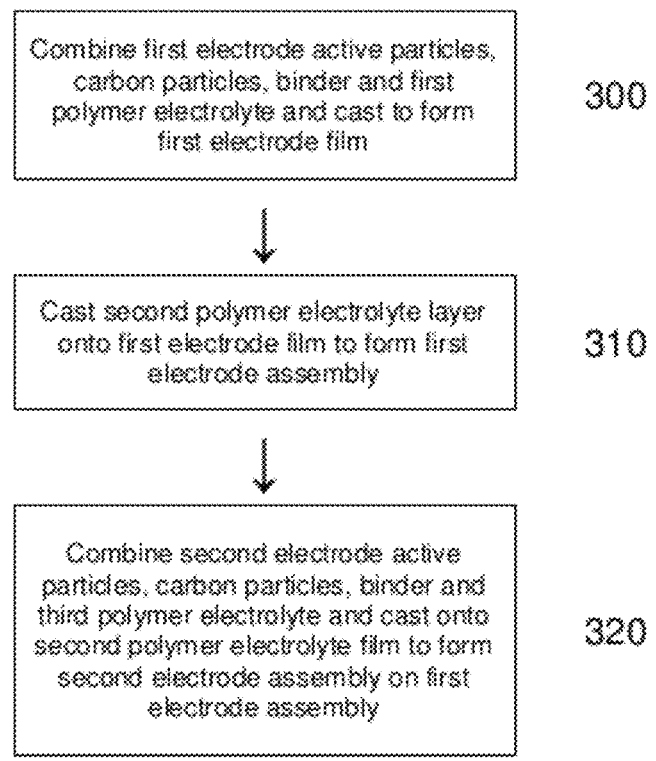
FIG. 3 is a flow chart that outlines novel steps in forming a battery cell, according to an embodiment of the invention.

In one embodiment of the invention, a battery cell is constructed according to the steps outlined in FIG. 3. In step 300, first electrode active particles, carbon particles, optional binder and a first liquefied solid polymer electrolyte are combined to form a slurry. The slurry is then cast onto a current collector to form a first electrode film. In some arrangements, where there is sufficient electronic conductivity in the first electrode film without the addition of carbon particles, no carbon particles are included in the first electrode film. In some arrangements, where the first solid polymer electrolyte can act as both electrolyte and binder, no additional binder is included in the first electrode film. The first electrode film may contain pores. Pore volume can be reduced by pressing or calendaring the film.

In step 310, a liquefied second polymer electrolyte layer is cast onto the first electrode film to form a first dual-layer electrode assembly. In one arrangement, the second solid polymer electrolyte can be combined with a solvent to form a liquefied second polymer electrolyte that is appropriate for the casting process. As is well known to a person of ordinary skill in the art, the viscosity of such a liquefied polymer electrolyte can be adjusted as desired by choice and amount of solvent. In one embodiment of the invention, a wetting agent is added to the liquefied second polymer electrolyte to ensure that the electrolyte wets the first electrode film. In one arrangement, the solvent used to make the liquefied second polymer electrolyte is also a solvent for the first polymer electrolyte. When the liquefied second polymer electrolyte is cast onto the first electrode film, there is some dissolution of the first polymer electrolyte at the surface and some intermixing of the first polymer electrolyte and the second polymer electrolyte at the interface, which ensures uniform and continuous contact between the layers. In some arrangements, the liquefied solid polymer electrolyte can percolate through and fill pores in part or all of the first electrode film. The liquefied second polymer electrolyte is allowed to dry so that it solidifies into a second solid polymer electrolyte layer.

In another arrangement, in step 310 the second solid polymer electrolyte can be melted to form a liquefied second polymer electrolyte that is appropriate for the casting process. As is well known to a person of ordinary skill in the art, the viscosity of such a liquefied polymer electrolyte can be adjusted as desired by choice of temperature. In one embodiment of the invention, a wetting agent is added to the liquefied second polymer electrolyte to ensure that the electrolyte wets the first electrode film. In one arrangement, the temperature used to melt the second polymer electrolyte can also melt the first solid polymer electrolyte. When the liquefied second polymer electrolyte is cast onto the first electrode film, there is some melting of the first polymer electrolyte at the surface and some intermixing of the first polymer electrolyte and the second polymer electrolyte at the interface, which ensures uniform and continuous contact between the layers. In some arrangements, the liquefied solid polymer electrolyte can percolate through and fill pores in part or all of the first electrode film. The liquefied second polymer electrolyte is allowed to cool so that it solidifies into a second solid polymer electrolyte layer.

In step 320, second electrode active particles, carbon particles, optional binder and a third solid polymer electrolyte are combined with a solvent or heated to the melting temperature of the third solid polymer electrolyte to form a slurry. Wetting agents can be used in the slurry if desired. The slurry is then cast onto the second solid polymer electrolyte film and allowed to dry or cool. Thus the second electrode assembly is formed on the second electrolyte layer which is adjacent the first electrode assembly. In other arrangements, a fourth electrolyte layer is formed on the second electrolyte layer and then the second electrode assembly is cast directly onto the fourth electrolyte layer. In either case, a complete cell stack is formed by repeated casting of layer upon layer.

In one arrangement, the first, second, third, and fourth solid polymer electrolytes are each different from one another. In another arrangement, the first, second, third, and fourth solid polymer electrolytes are all the same. In yet other arrangements, the first, second, third, and fourth solid polymer electrolytes can include only three different solid polymer electrolytes, or only two different solid polymer electrolytes, distributed in any combination among the first, second, third, and fourth solid polymer electrolyte regions.

Figure 4:
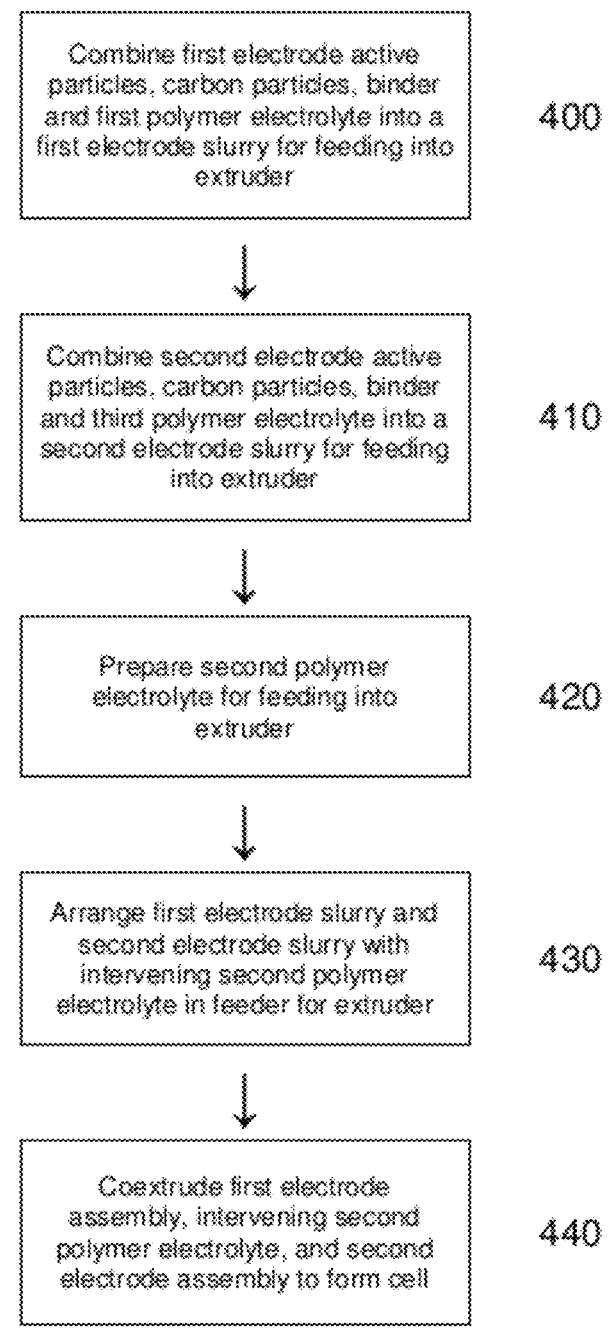
FIG. 4 is a flow chart that outlines novel steps in forming a battery cell, according to another embodiment of the invention.

In another embodiment of the invention, a battery cell is constructed according to the steps outlined in FIG. 4. In step 400, first electrode active particles, carbon particles, optional binder and a liquefied first polymer electrolyte are combined to form a first electrode slurry. The first polymer electrolyte is dissolved in solvent or melted to make a liquefied solid so that the slurry has properties appropriate for extrusion. In step 410, second electrode active particles, carbon particles, optional binder and a liquefied third polymer electrolyte are combined to form a second electrode slurry. The third polymer electrolyte is dissolved in solvent or melted so that the slurry has properties appropriate for extrusion. In step 420, a second polymer electrolyte is liquefied to prepare for the extrusion process. The second polymer electrolyte is dissolved in solvent or melted so that the slurry has properties appropriate for extrusion.

In step 430, the first electrode slurry, the second electrode slurry and the second polymer electrolyte are arranged to feed into an extruder so that they can exit the extruder in a stacked configuration with the second polymer electrolyte between the first electrode and the second electrode. The extruder may have three separate, stacked feeds, in which case the first electrode slurry and the second electrode slurry enter the extruder one each through the outermost feeds, and the second polymer electrolyte enters the extruder through the middle feed. The first electrode slurry, the second electrode slurry, and the second liquefied polymer electrolyte are coextruded to form a three-layer electrochemical cell stack. In other arrangements, the extruder has four separate, stacked feeds, and a liquefied fourth electrolyte enters the extruder through the second middle feed. The two electrode slurries and the two liquefied polymer electrolytes are coextruded to form a four-layer electrochemical cell stack. The materials in the stack layers are in liquefied form during the coextrusion so they form integrated interfaces as they solidify into the cell stack.

In one arrangement, the first, second, third, and fourth solid polymer electrolytes are each different from one another. In another arrangement, the first, second, third, and fourth solid polymer electrolytes are all the same. In yet other arrangements, the first, second, third, and fourth solid polymer electrolytes can include only three different solid polymer electrolytes, or only two different solid polymer electrolytes, distributed in any combination among the first, second, third, and fourth solid polymer electrolyte regions.

Figure 5:
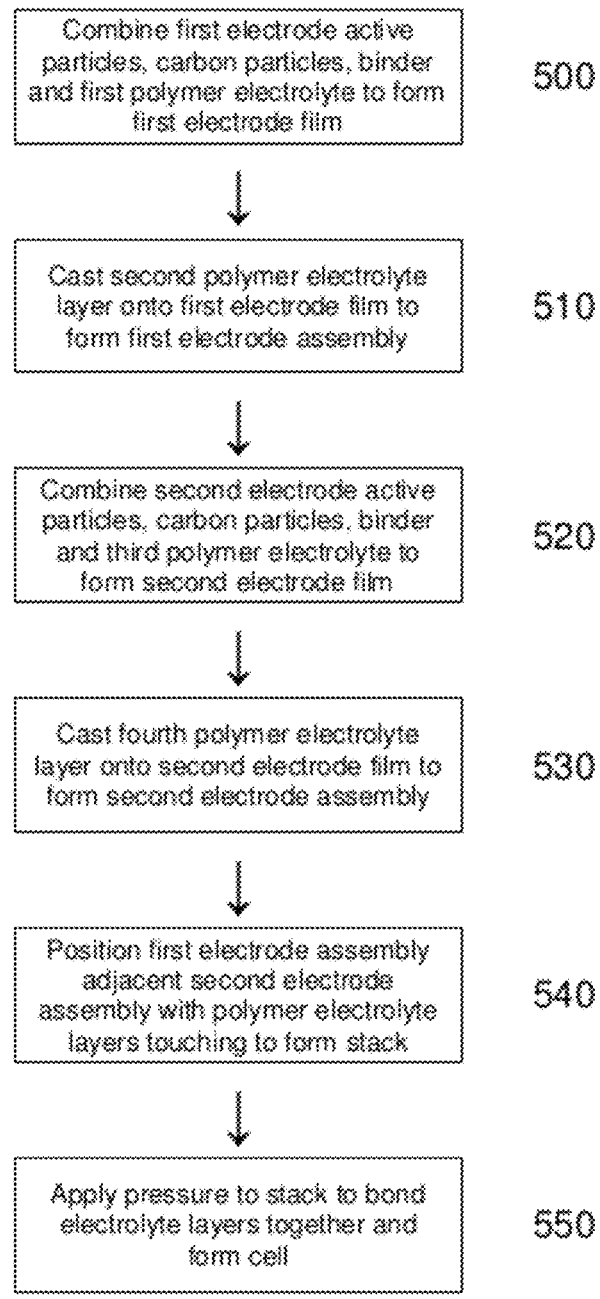
FIG. 5 is a flow chart that outlines novel steps in forming a battery cell, according to yet another embodiment of the invention.

In one embodiment of the invention, a battery cell is constructed according to the steps outlined in FIG. 5. In step 500, first electrode active particles, carbon particles, binder and a liquefied first polymer electrolyte are combined to form a slurry. The slurry is then either cast onto a current collector or extruded and then adhered to a current collector to form a first electrode film. In some arrangements, where there is sufficient electronic conductivity in the first electrode film without the addition of carbon particles, no carbon particles are included in the first electrode film. In some arrangements, where the first solid polymer electrolyte can act as both electrolyte and binder, no additional binder is included in the first electrode film. In step 510, a liquefied second polymer electrolyte layer is cast onto the first electrode film to form a first dual-layer electrode assembly. The second solid polymer electrolyte can be combined with a solvent to form a liquefied second polymer electrolyte that is appropriate for the casting process. As is well known to a person of ordinary skill in the art, the viscosity of such a liquefied polymer electrolyte can be adjusted as desired by choice and amount of solvent. In one embodiment of the invention, a wetting agent is added to the liquefied second polymer electrolyte to ensure that the polymer wets the first electrode film. In one arrangement, the solvent used to make the liquefied second polymer electrolyte is also a solvent for the first polymer electrolyte. When the liquefied second polymer electrolyte is cast onto the first electrode film, there is some dissolution of the first polymer electrolyte at the surface and some intermixing of the first polymer electrolyte and the second polymer electrolyte at the interface, which ensures uniform and continuous contact between the layers. The second polymer electrolyte is allowed to dry so that it solidifies into a second solid polymer electrolyte layer.

In another arrangement, in step 510 the second solid polymer electrolyte can be melted to form a liquefied second polymer electrolyte melt that is appropriate for the casting process. As is well known to a person of ordinary skill in the art, the viscosity of such a liquefied polymer electrolyte can be adjusted as desired by choice of temperature. In one embodiment of the invention, a wetting agent is added to the liquefied second polymer electrolyte to ensure that the polymer wets the first electrode film. In one arrangement, the temperature used to melt the second polymer electrolyte can also melt the first solid polymer electrolyte. When the liquefied second polymer electrolyte is cast onto the first electrode film, there is some melting of the first polymer electrolyte at the surface and some intermixing of the first polymer electrolyte and the second polymer electrolyte at the interface, which ensures uniform and continuous contact between the layers. The second polymer electrolyte is allowed to cool so that it solidifies into a second solid polymer electrolyte layer.

In step 520, second electrode active particles, carbon particles, binder and a liquefied third polymer electrolyte are combined to form a slurry. The slurry is then either cast onto a current collector extruded to form a second electrode film. In some arrangements, where there is sufficient electronic conductivity in the second electrode film without the addition of carbon particles, no carbon particles are included in the second electrode film. In some arrangements, where the third solid polymer electrolyte can act as both electrolyte and binder, no additional binder is included in the second electrode film. In step 530, a liquefied fourth polymer electrolyte layer is cast onto the second electrode film to form a second dual-layer electrode assembly. The fourth solid polymer electrolyte can be combined with a solvent to form a liquefied fourth polymer electrolyte that is appropriate for the casting process. As is well known to a person of ordinary skill in the art, the viscosity of such a liquefied polymer electrolyte can be adjusted as desired by choice and amount of solvent. In one embodiment of the invention, a wetting agent is added to the liquefied fourth polymer electrolyte to ensure that the polymer wets the second electrode film. In one arrangement, the solvent used to make the liquefied fourth polymer electrolyte is also a solvent for the third solid polymer electrolyte. When the liquefied fourth polymer electrolyte is cast onto the second electrode film, there can some dissolution of the third solid polymer electrolyte at the surface and some intermixing of the third polymer electrolyte and the fourth polymer electrolyte at the interface. The liquefied fourth polymer electrolyte is allowed to dry so that it solidifies into a fourth solid polymer electrolyte layer.

In another arrangement, in step 530 the fourth solid polymer electrolyte can be melted to form a liquefied fourth polymer electrolyte melt that is appropriate for the casting process. As is well known to a person of ordinary skill in the art, the viscosity of such a liquefied polymer electrolyte can be adjusted as desired by choice of temperature. In one embodiment of the invention, a wetting agent is added to the liquefied fourth polymer electrolyte to ensure that the polymer wets the second electrode film. In one arrangement, the temperature used to melt the fourth polymer electrolyte can also melt the second solid polymer electrolyte. When the liquefied fourth polymer electrolyte is cast onto the second electrode film, there is some melting of the third polymer electrolyte at the surface and some intermixing of the third polymer electrolyte and the fourth polymer electrolyte at the interface, which ensures uniform and continuous contact between the layers. The liquefied fourth polymer electrolyte is allowed to cool so that it solidifies into a fourth solid polymer electrolyte layer.

In step 540, a cell stack is formed by positioning the first electrode assembly adjacent the second electrode assembly with the second solid polymer electrolyte layer and the fourth solid polymer electrolyte facing one another. In step 550, pressure and in some arrangements, heat, are applied to the cell stack to bond the electrolyte layers together and form the cell. In one arrangement, if the liquefied second polymer electrolyte layer and the liquefied fourth polymer electrolyte layer have not yet solidified fully, there may be some mixing of one in the other at the interface, ensuring good contact between the second solid polymer electrolyte layer and the fourth solid polymer electrolyte layer.

In another embodiment of the invention, the polymer electrolyte layers are not cast onto the electrode film as has been described in steps 510 and 530 in FIG. 5. Alternatively, coextrusion is used. Details of the coextrusion method have been described above with reference to FIG. 4.

In one arrangement, the first, second, third, and fourth solid polymer electrolytes are each different from one another. In another arrangement, the first, second, third, and fourth solid polymer electrolytes are all the same. In yet other arrangements, the first, second, third, and fourth solid polymer electrolytes can include only three different solid polymer electrolytes, or only two different solid polymer electrolytes, distributed in any combination among the first, second, third, and fourth solid polymer electrolyte regions.

Figure 6:
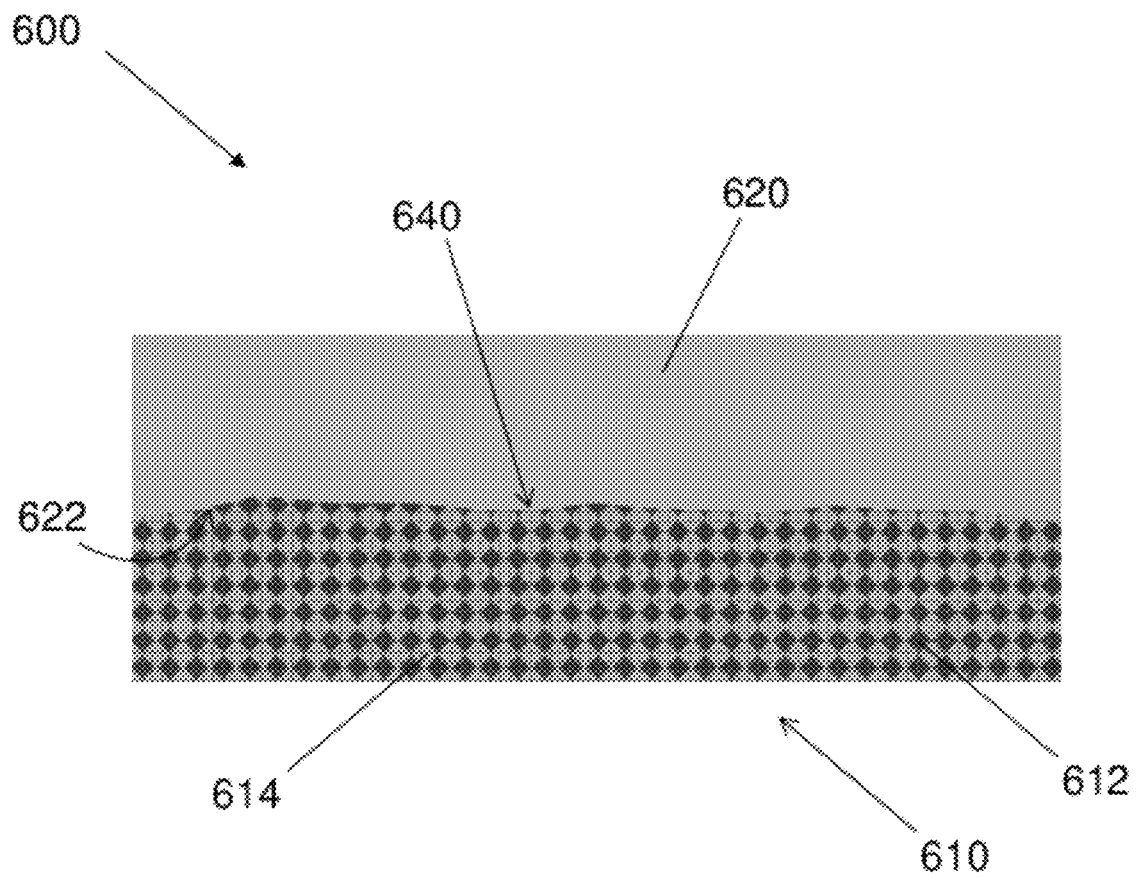
FIG. 6 is a schematic drawing of a dual-layer electrode assembly, made according to some of the steps outlined in FIG. 5.

FIG. 6 is a schematic drawing of a dual-layer electrode assembly 600 made according to the novel methods described in FIG. 3, 4, or 5 above. The assembly 600 has an electrode film 610 and a solid polymer electrolyte layer 620. The electrode film 610 includes a variety of randomly distributed particles (shown collectively as black regions 612), such as electrode active particles and optionally, conductive carbon particles and/or binder particles, all surrounded by a solid polymer electrolyte (grey regions) 614. For the purpose of this illustration, no porosity is shown, but the electrode film 610 may contain pores in some arrangements. The electrode film 610 has an irregular surface 622. In some arrangements, the surface 622 is flat. As described above in reference to FIGS. 3, 4, 5, a solid polymer electrolyte is either dissolved in a solvent or melted to form a liquefied solid and then cast onto the electrode film 610. The liquefied polymer electrolyte fills in the irregularities in the surface 622. The liquefied polymer electrolyte dries or cools to solidify into the solid polymer electrolyte layer 620, which has a continuous interface 640 with the electrode film 610. The interface 640 has no gaps. In addition, there can be some mixing of the electrolyte 614 (from the electrode film 610) in the liquefied electrolyte 620 during the casting process, further ensuring good conformity and excellent contact between the electrode film 610 and the solid polymer electrolyte 620. Good and continuous contact between the layers in a battery cell is one characteristic that is essential to achieving the best possible performance from the cell.

Figure 7:
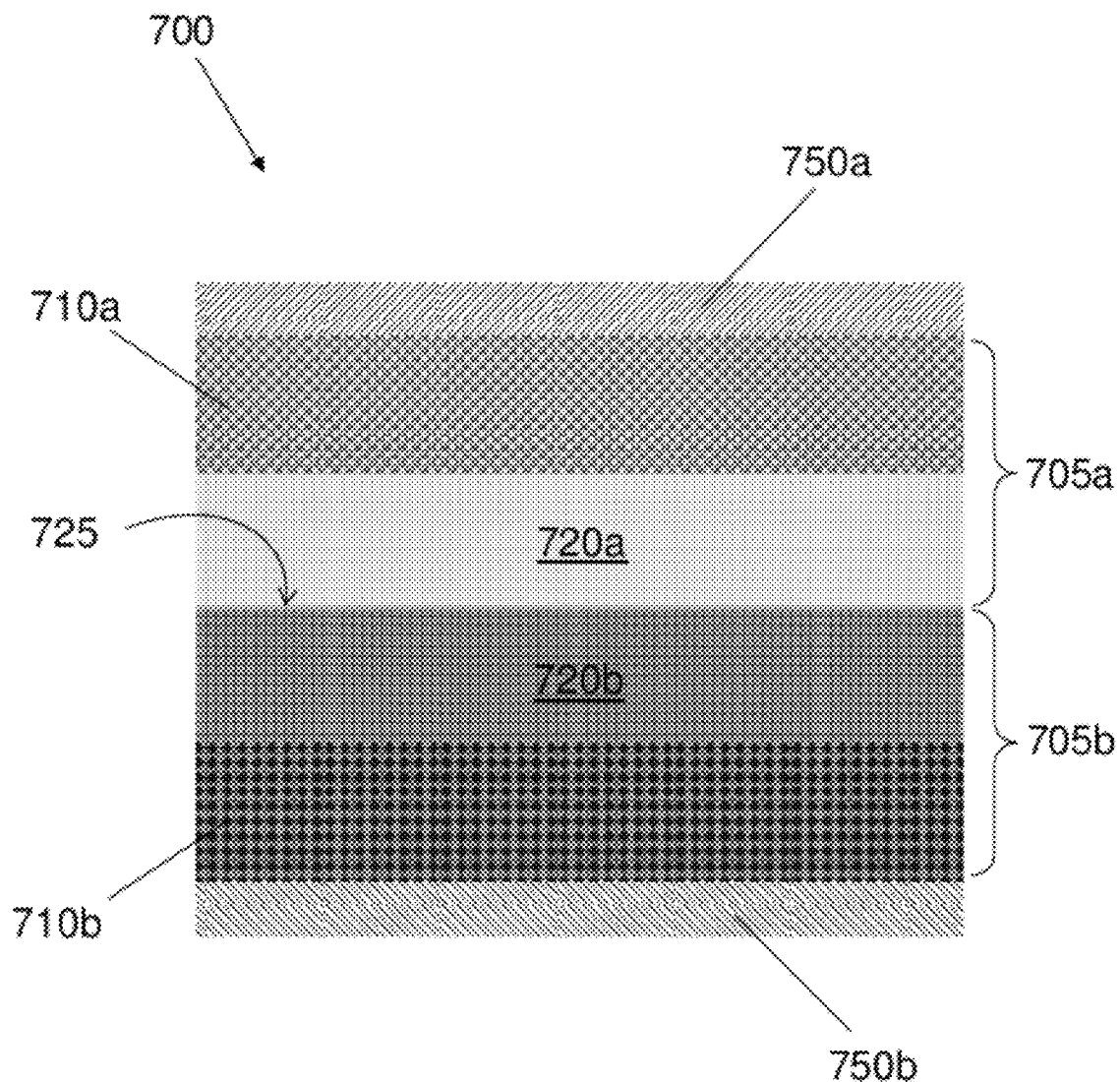
FIG. 7 is a schematic illustration of a battery cell made according to the steps outlined in FIG. 5.

FIG. 7 is a schematic illustration of a battery cell 700 that includes two dual-layer electrode assemblies 705*a*, 705*b*, made according to any of the novel methods described above in FIG. 3, 4, or 5. The first dual-layer assembly 705*a* has a solid polymer electrolyte layer 720*a* that has been cast onto or coextruded with a first electrode film 710*a*. The second dual-layer assembly 705*b* has a solid polymer electrolyte layer 720*b* that has been cast onto or coextruded with a second electrode film 710*b*. The solid polymer electrolyte layer 720*a* and the solid polymer electrolyte layer 720*b* have been pressed, and perhaps heated, together to form the battery cell 700. In one arrangement, the polymer electrolyte layers 720*a*, 720*b* have not yet solidified fully when they are pressed together. The interface 725 between the two solid polymer electrolyte layers 720*a*, 720*b* has no gaps. In addition, there can be some mixing (either by dissolution or by diffusion through the melt) of the electrolytes 720*a*, 720*b* in one another as they are pressed together and, in some arrangements, heated, further ensuring good conformity and excellent contact between the dual-layer electrode assemblies 705*a*, 705*b*, and eliminating the possibility of degraded battery performance because of poor contact between component layers. In FIG. 7, optional current collectors 750*a*, 750*b* that provide electronic conduction paths to and from electrodes 710*a*, 710*b*, respectively, are also shown.

Figure 8:
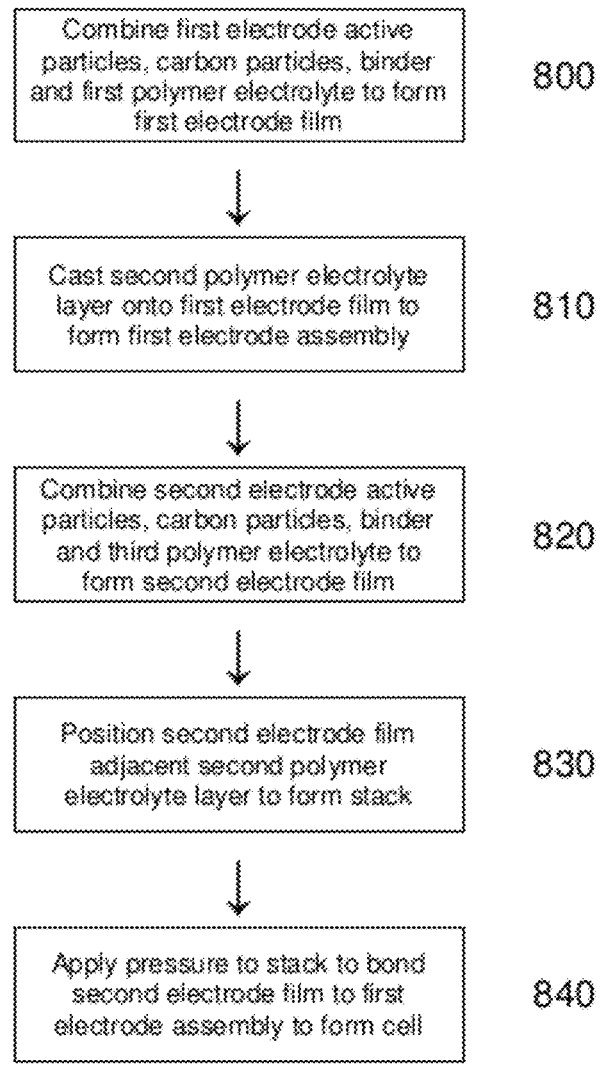
FIG. 8 is a flow chart that outlines the novel steps in forming a battery cell, according to another embodiment of the invention.

In another embodiment of the invention, a battery cell is constructed according to the steps outlined in FIG. 8. In step 800, first electrode active particles, carbon particles, binder and a liquefied first polymer electrolyte are combined to form a slurry. The slurry is then either cast or extruded to form a first electrode film. In some arrangements, where there is sufficient electronic conductivity in the first electrode film without the addition of carbon particles, no carbon particles are included in the first electrode film. In some arrangements, where the first polymer electrolyte can act as both electrolyte and binder, no additional binder is included in the first electrode film. In step 810, a second solid polymer electrolyte layer is cast onto the first electrode film to form a first dual-layer electrode assembly. The second solid polymer electrolyte can be combined with a solvent to form a liquefied second polymer electrolyte that is appropriate for the casting process. As is well known to a person of ordinary skill in the art, the viscosity of such a polymer electrolyte solution can be adjusted as desired by choice and amount of solvent. In one embodiment of the invention, a wetting agent is added to the second polymer electrolyte solution to ensure that the solution wets the first electrode film. In one arrangement, the solvent used to make the second polymer electrolyte solution is also a solvent for the first polymer electrolyte. When the second polymer electrolyte is cast onto the first electrode film, there is some dissolution of the first polymer electrolyte at the surface and some intermixing of the first polymer electrolyte and the second polymer electrolyte at the interface, which ensures uniform and continuous contact between the layers. The second polymer electrolyte is allowed to dry so that it solidifies into a second solid polymer electrolyte layer.

In another arrangement, in step 810 the second solid polymer electrolyte can be melted to form a dissolved or melted liquefied second polymer electrolyte that is appropriate for the casting process. As is well known to a person of ordinary skill in the art, the viscosity of such a liquefied polymer electrolyte can be adjusted as desired by choice of temperature. In one embodiment of the invention, a wetting agent is added to the liquefied second polymer electrolyte to ensure that the electrolyte wets the first electrode film. In one arrangement, the temperature used to melt the second polymer electrolyte can also melt the first solid polymer electrolyte. When the second polymer electrolyte is cast onto the first electrode film, there is some melting of the first polymer electrolyte at the surface and some intermixing of the first polymer electrolyte and the second polymer electrolyte at the interface, which ensures uniform and continuous contact between the layers. The second polymer electrolyte is allowed to cool so that it solidifies into a second solid polymer electrolyte layer.

In step 820, second electrode active particles, liquefied third polymer electrolyte, and, optionally, carbon particles and binder are combined and to form a slurry. The slurry is then either cast or extruded to form a second electrode film. The second electrode film is placed adjacent the second solid polymer electrolyte layer and aligned to form a battery cell stack in step 830. In step 840, pressure, and, in some arrangements, heat, is applied to the stack to bond the second electrode film to the dual-layer electrode assembly to form a cell. In one arrangement, if the second polymer electrolyte layer has not yet solidified fully, there can be some intermixing of the third polymer electrolyte with the second polymer electrolyte at the interface.

Figure 9:
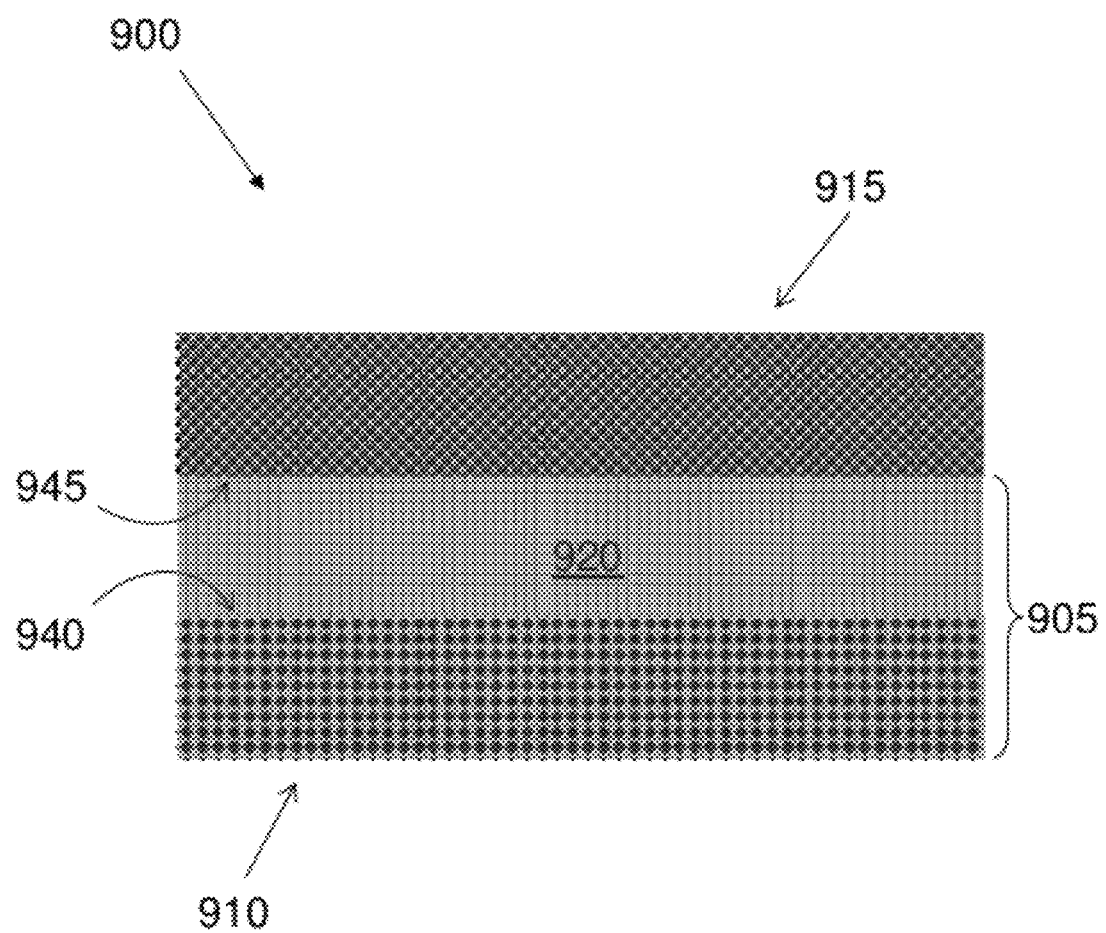
FIG. 9 is a schematic illustration of a battery cell that has been fabricated according to the steps outlined in FIG. 8.

FIG. 9 is a schematic illustration of a battery cell 900 that has been fabricated according to the steps outlined in FIG. 8. A dual-layer electrode assembly 905 includes a first electrode film 910 and an electrolyte layer 920. The first electrode film 910 has been formed by combining first electrode active particles, a first polymer electrolyte, and, optionally, binder and/or carbon particles to form a slurry. The slurry is then either cast or extruded to form the electrode film 910. A second solid polymer electrolyte is dissolved in a solvent or melted to form a liquid and then cast onto the electrode film 910. The liquefied second polymer electrolyte solidifies, either through drying or cooling, to form the second solid polymer electrolyte layer 920, which has a continuous interface 940 with the first electrode film 910. The first electrode assembly 910 and the electrolyte layer 920 are well-bonded together at interface 940, as has been described above. A second electrode film 915 has been formed by combining second electrode active particles, a third polymer electrolyte, and, optionally, binder and/or carbon particles to form a slurry. The slurry is then either cast or extruded to form the second electrode film 915. The second electrode 915 and the dual-layer electrode assembly 905 have been pressed, and perhaps heated together, forming an interface 945 between the second electrolyte layer 920 and the second electrode 915. In one arrangement, the polymer electrolyte layer 920 has not solidified fully when the second electrode 915 is pressed against it. Solvent from the electrolyte layer 920 may be able to dissolve a surface portion of the electrolyte in electrode layer 915, or heat from the electrolyte layer 920 may be able to melt a surface portion of the electrolyte in electrode layer 915, causing some intermixing of the electrolytes and aiding in the formation of a seamless interface with few or no defects, such as gaps.

In another embodiment of the invention, the first electrode film 910, the second polymer electrolyte layer 920, and the second electrode film 915 can be coextruded, as has been described above.

As discussed above, in one embodiment, there is only one solid polymer electrolyte used throughout a battery cell—in both electrodes and in a single layer or multiple layers between the electrodes. In other embodiments, a different solid polymer electrolyte is used in each region of the cell. In yet other arrangements three different solid polymer electrolytes, or two different solid polymer electrolytes, are used throughout the cell in various arrangements among the electrolyte regions of the cell.

Various wetting agents can be used to ensure that, during the casting or extrusion process, a liquefied solid polymer electrolyte (solution or melt) is able to wet an adjacent layer in the cell stack. Examples of such wetting agents include, but are not limited to n-methylpyrolidinone, dimethylformamide, acetonitrile, toluene, benzene, acetone.

In one embodiment of the invention, after the electrode assembly or the entire battery cell is made, the electrode thin film has a porosity less than about 10%. In another embodiment, after the electrode assembly or the entire battery cell is made, the electrode thin film has a porosity less than about 1%. In some arrangements, the electrode thin film can be calendared to reduce or remove open pores within the film before an electrolyte is cast into it.

Examples of negative electrode active materials that can be used in the embodiments of the invention include, but are not limited to metals, alloys, or metal oxides, which can form well-defined intermetallic/intercalation phases with lithium, are used. Examples of appropriate materials include, but are not limited to, metals such as, aluminum (Al), silicon (Si), germanium (Ge), tin (Sn), lead (Pb), antimony (Sb), magnesium (Mg); Si alloys with elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), chromium (Cr), and their alloys and oxides; carbon and silicon carbides; alloys such as Cu—Sn, Sb—Sn; and lithium or lithium-rich alloys such as Li—Al, Li—Si, Li—Sn, Li—Hg, Li—Zn, Li—Pb, and Li—C.

Examples of positive electrode active materials that can be used in the embodiments of the invention include, but are not limited to materials having the general formula $Li_xA_{1-y}M_yO_2$, wherein A includes at least one transition element selected from a group including Mn, Co, and Ni; M includes at least one element selected from a group including B, Mg, Ca, Sr, Ba, Ti, V, Cr, Mn, Fe, Co, Ni, Cu, Al, In, Nb, Mo, W, Y, and Rh; x ranges between $0.05 \leq x \leq 1.1$; and y ranges between $0 \leq y \leq 0.5$.

Electrolytes

There are a variety of solid polymer electrolytes that are appropriate for use in the inventive methods described herein. In one embodiment of the invention, the solid polymer electrolyte contains one or more of the following optionally cross-linked polymers: polyethylene oxide, polysulfone, polyacrylonitrile, siloxane, polyether, polyamine, linear copolymers containing ethers or amines, ethylene carbonate, Nafion®, and polysiloxane grafted with small molecules or oligomers that include polyethers and/or alkylcarbonates.

In one embodiment of the invention, the solid polymer electrolyte, when combined with an appropriate salt, is chemically and thermally stable and has an ionic conductivity of at least $10^{-5}$ $Scm^{-1}$ at a desired operating temperature. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, lithium alkyl fluorophosphates, lithium oxalatoborate, as well as other lithium bis(chelato)borates having five to seven membered rings, lithium bis(trifluoromethane sulfone imide) (LiTFSI), $LiPF_3(C_2F_5)_3$, $LiPF_3(CF_3)_3$, $LiB(C_2O_4)_2$, and mixtures thereof. In other embodiments of the invention, for other electrochemistries, electrolytes are made by combining the polymers with various kinds of salts. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$.

As described in detail above, a block copolymer electrolyte can be used in the embodiments of the invention.

Figure 10A:
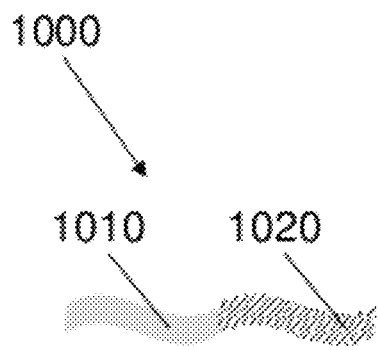
FIG. 10 is a schematic drawing of a diblock copolymer and a domain structure it can form, according to an embodiment of the invention.

FIG. 10A is a simplified illustration of an exemplary diblock polymer molecule 1000 that has a first polymer block 1010 and a second polymer block 1020 covalently bonded together. In one arrangement both the first polymer block 1010 and the second polymer block 1020 are linear polymer blocks. In another arrangement, either one or both polymer blocks 1010, 1020 has a comb structure. In one arrangement, neither polymer block is cross-linked. In another arrangement, one polymer block is cross-linked. In yet another arrangement, both polymer blocks are cross-linked.

Figure 10B:
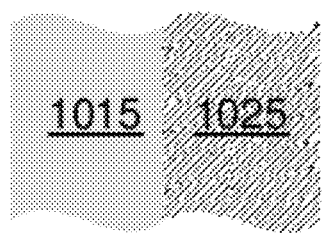
Figure 10C:
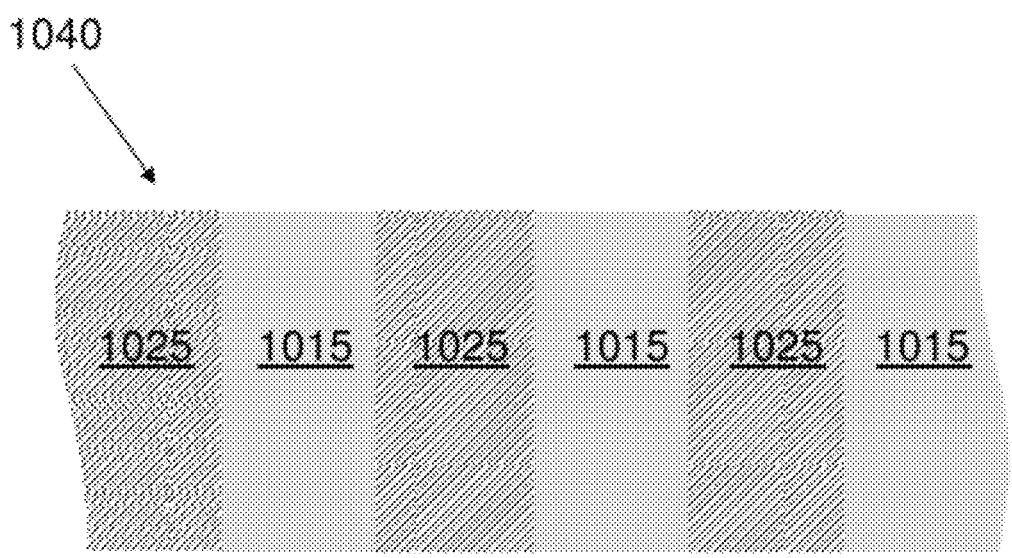

Multiple diblock polymer molecules 1000 can arrange themselves to form a first domain 1015 of a first phase made of the first polymer blocks 1010 and a second domain 1025 of a second phase made of the second polymer blocks 1020, as shown in FIG. 10B. Diblock polymer molecules 1000 can arrange themselves to form multiple repeat domains, thereby forming a continuous nanostructured block copolymer material 1040, as shown in FIG. 10C. The sizes or widths of the domains can be adjusted by adjusting the molecular weights of each of the polymer blocks.

In one arrangement the first polymer domain 1015 is ionically conductive, and the second polymer domain 1025 provides mechanical strength to the nanostructured block copolymer.

Figure 11A:
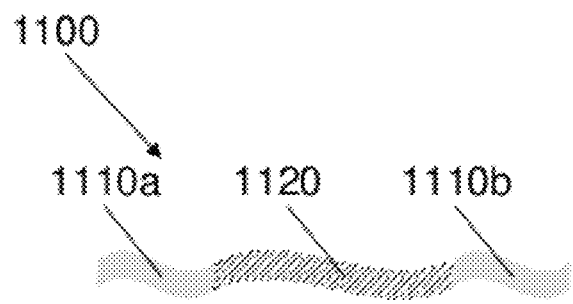
FIG. 11 is a schematic drawing of a triblock copolymer and a domain structure it can form, according to an embodiment of the invention.

FIG. 11A is a simplified illustration of an exemplary triblock polymer molecule 1100 that has a first polymer block 1110a, a second polymer block 1120, and a third polymer block 1110b that is the same as the first polymer block 1110a, all covalently bonded together. In one arrangement the first polymer block 1110a, the second polymer block 1120, and the third copolymer block 1110b are linear polymer blocks. In another arrangement, either some or all polymer blocks 1110a, 1120, 1110b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 11B:
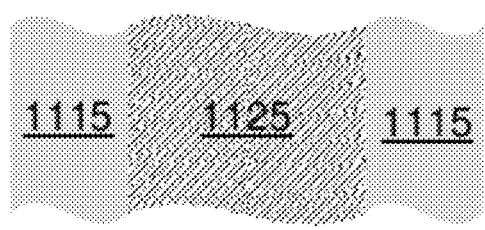
Figure 11C:
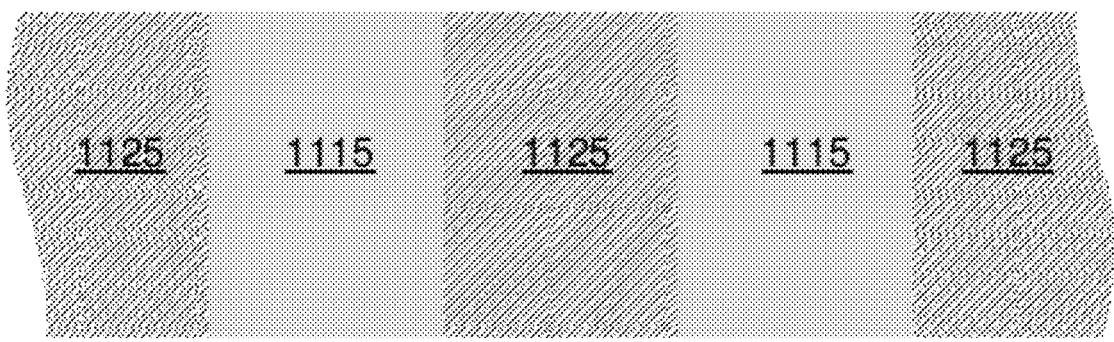

Multiple triblock polymer molecules 1100 can arrange themselves to form a first domain 1115 of a first phase made of the first polymer blocks 1110a, a second domain 1125 of a second phase made of the second polymer blocks 1120, and a third domain 1115b of a first phase made of the third polymer blocks 1110b as shown in FIG. 11B. Triblock polymer molecules 1100 can arrange themselves to form multiple repeat domains 1125, 1115 (containing both 1115a and 1115b), thereby forming a continuous nanostructured block copolymer 1130, as shown in FIG. 11C. The sizes of the domains can be adjusted by adjusting the molecular weights of each of the polymer blocks.

In one arrangement the first and third polymer domains 1115a, 1115b are ionically conductive, and the second polymer domain 1125 provides mechanical strength to the nanostructured block copolymer. In another arrangement, the second polymer domain 1125 is ionically conductive, and the first and third polymer domains 1115 provide a structural framework.

Figure 12A:
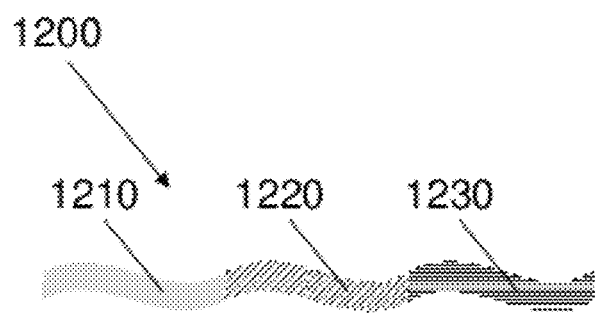
FIG. 12 is a schematic drawing of a triblock copolymer and a domain structure it can form, according to another embodiment of the invention.

FIG. 12A is a simplified illustration of another exemplary triblock polymer molecule 1200 that has a first polymer block 1210, a second polymer block 1220, and a third polymer block 1230, different from either of the other two polymer blocks, all covalently bonded together. In one arrangement the first polymer block 1210, the second polymer block 1220, and the third copolymer block 1230 are linear polymer blocks. In another arrangement, either some or all polymer blocks 1210, 1220, 1230 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 12B:
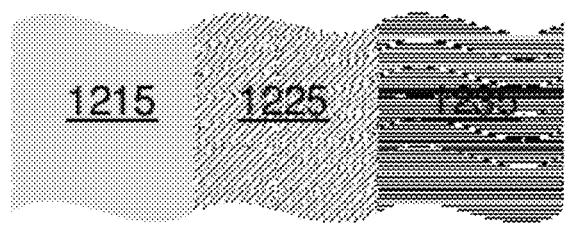
Figure 12C:
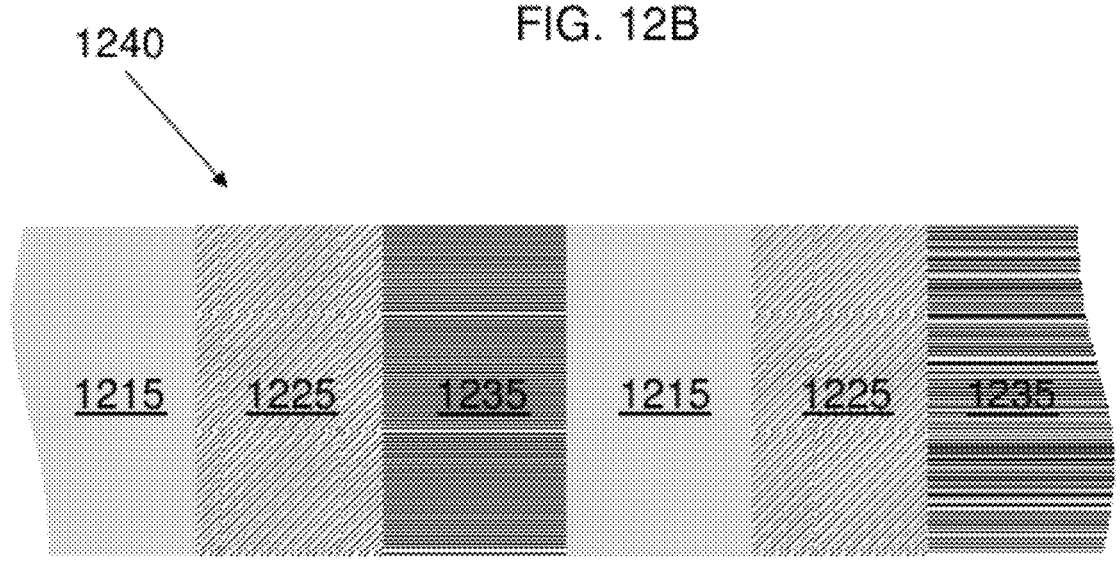

Multiple triblock polymer molecules 1200 can arrange themselves to form a first domain 1215 of a first phase made of the first polymer blocks 1210a, a second domain 1225 of a second phase made of the second polymer blocks 1220, and a third domain 1235 of a third phase made of the third polymer blocks 1230 as shown in FIG. 12B. Triblock polymer molecules 1200 can arrange themselves to form multiple repeat domains, thereby forming a continuous nanostructured block copolymer 1240, as shown in FIG. 12C. The sizes of the domains can be adjusted by adjusting the molecular weights of each of the polymer blocks.

In one arrangement the first polymer domains 1215 are ionically conductive, and the second polymer domains 1225 provide mechanical strength to the nanostructured block copolymer. The third polymer domains 1235 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear polymer. Conductive linear polymers that can be used in the conductive phase include, but are not limited to, polyethers, polyamines, polyimides, polyamides, alkyl carbonates, polynitriles, and combinations thereof. The conductive linear polymers can also be used in combination with polysiloxanes, polyphosphazines, polyolefins, and/or polydienes to form the conductive phase.

In another exemplary embodiment, the conductive phase is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Patent Application No. PCT/US09/45356, filed May 27, 2009, International Patent Application No. PCT/US09/54709, filed Aug. 22, 2009, U.S. Provisional Patent Application No. 61/145518, filed Jan. 16, 2009, U.S. Provisional Patent Application No. 61/145507, filed Jan. 16, 2009, U.S. Provisional Patent Application No. 61/158257, filed Mar. 6, 2009, and U.S. Provisional Patent Application No. 61/158241, filed Mar. 6, 2009, all of which are included by reference herein.

There are no particular restrictions on the electrolyte that can be used in the block copolymer electrolytes. Any electrolyte salt that includes the ion identified as the most desirable charge carrier for the application can be used. It is especially useful to use electrolyte salts that have a large dissociation constant within the polymer electrolyte. Non-lithium salts such as salts of aluminum, sodium, and magnesium are examples of other salts that can be used.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

In one embodiment of the invention, neither small molecules nor plasticizers are added to the block copolymer electrolyte and the block copolymer electrolyte is a dry polymer.

Further details about block copolymer electrolytes are described in U.S. patent application Ser. No. 12/225,934, filed Oct. 1, 2008, U.S. patent application Ser. No. 12/271,1828, filed Nov. 14, 2008, and International Patent Application No. PCT/US09/31356, filed Jan. 16, 2009, all of which are included by reference herein.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method of forming an electrode assembly, comprising:
    mixing together electrode active material and a liquefied first polymer electrolyte to make a slurry;
    forming the slurry into a thin film;
    allowing the first polymer electrolyte to solidify, thereby forming an electrode comprising a solid first polymer electrolyte binding together the first electrode active material;
    preparing a liquefied second polymer electrolyte, the electrolyte adapted to wet the thin film electrode;
    applying the liquefied second polymer electrolyte onto the thin film electrode to form a liquid layer; and
    allowing the liquid layer to solidify, thereby forming a solid second polymer electrolyte layer on the thin film electrode;
    wherein no additional binder is used to form the electrode.

2. The method of claim 1 wherein there is no cross-linking step used to form the solid first polymer electrolyte.

3. The method of claim 1 wherein there is no cross-linking step used to form the solid second polymer electrolyte.

4. The method of claim 1 wherein the first polymer electrolyte and the second polymer electrolyte are the same.

5. The method of claim 1 further comprising mixing electronically conductive particles into the slurry.

6. The method of claim 1 wherein forming the slurry into a thin film electrode comprises forming the slurry into a thin film electrode on a current collector.

7. The method of claim 1 wherein forming the slurry into a thin film electrode comprises casting the slurry.

8. The method of claim 1 wherein forming the slurry into a thin film electrode comprises extruding the slurry.

9. The method of claim 1 wherein the liquefied first polymer electrolyte and/or liquefied second polymer electrolyte are formed by dissolving in a solvent or by melting.

10. The method of claim 1 wherein preparing the liquefied first polymer electrolyte and/or the liquefied second polymer electrolyte further comprises adding a wetting agent.

11. The method of claim 1, further comprising calendaring the thin film electrode before applying the liquefied second polymer electrolyte.

12. The method of claim 1 wherein the thin film electrode is porous, and applying the liquefied second polymer electrolyte onto the thin film electrode results in at least some pores being filled by the liquefied second polymer electrolyte.

13. The method of claim 12 wherein the thin film electrode has a porosity less than about 10% before the liquefied second polymer electrolyte is applied.

14. The method of claim 12 wherein the thin film electrode has a porosity less than about 1% before the liquefied second polymer electrolyte is applied.

15. The method of claim 1 wherein the first polymer electrolyte and the second polymer electrolyte is each selected independently from the group consisting of optionally cross-linked polymers: polyethylene oxide, polysulfone, polyacrylonitrile, siloxane, polyether, polyamine, linear copolymers containing ethers or amines, ethylene carbonate, Nafion®, polysiloxane grafted with small molecules or oligomers that include polyethers and/or alkylcarbonates, and combinations thereof.

16. The method of claim 1 wherein at least one of the first polymer electrolyte and the second polymer electrolyte is a block copolymer electrolyte.

17. The method of claim 16, wherein the block copolymer electrolyte comprises at least one lithium salt.

18. The method of claim 16 wherein the block copolymer is either a diblock copolymer or a triblock copolymer.

19. The method of claim 18 wherein a first block of the block copolymer is ionically conductive and is selected from the group consisting of polyethers, polyamines, polyimides, polyamides, alkyl carbonates, polynitriles, polysiloxanes, polyphosphazines, polyolefins, polydienes, and thereof.

20. The method of claim 18 wherein a first block of the block copolymer comprises an ionically-conductive comb polymer, which comb polymer comprises a backbone and pendant groups.

21. The method of claim 20 wherein the backbone comprises one or more selected from the group consisting of polysiloxanes, polyphosphazines, polyethers, polydienes, polyolefins, polyacrylates, polymethacrylates, and combinations thereof.

22. The method of claim 20 wherein the pendants comprise one or more selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

23. The method of claim 18 wherein a second block of the block copolymer is selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

24. A method of making a battery cell, comprising the steps of:
  a) mixing together first electrode active material and a liquefied first polymer electrolyte to make a slurry;
  b) forming the slurry into a first thin film;
  c) allowing the first polymer electrolyte to solidify, thereby forming a thin film electrode comprising a solid first polymer electrolyte binding together the first electrode active material;
  d) preparing a liquefied second polymer electrolyte adapted to wet the first thin film electrode;
  e) applying the liquefied second polymer electrolyte onto the first thin film electrode to form a liquefied second polymer electrolyte layer on the first thin film electrode;
  f) allowing the liquefied second polymer electrolyte to solidify at least partially to form a first electrode assembly;
  wherein no additional binder is used to form the first electrode assembly; and
  g) positioning a second electrode assembly to be in ionic communication with the second solid polymer electrolyte layer, thereby forming a battery cell.

25. The method of claim 24, further comprising in step (b): forming the slurry into a first thin film on a first current collector.

26. The method of claim 24 wherein after step (g) the second polymer electrolyte is allowed to solidify completely.

27. The method of claim 24 further wherein step (g) comprises the steps of:
  h) mixing together second electrode active material and a liquefied third polymer electrolyte to make a slurry;
  i) forming the slurry into a second thin film;
  j) allowing the third polymer electrolyte to solidify, thereby forming a second thin film electrode comprising a solid third polymer electrolyte binding together the second electrode active material;
  wherein no additional binder id used to form the second thin film electrode;
  k) preparing a liquefied fourth polymer electrolyte adapted to wet the second thin film electrode;
  l) applying the liquefied fourth polymer electrolyte onto the second thin film electrode to form a liquefied fourth polymer electrolyte layer on the second thin film electrode;
  m) allowing the liquefied fourth polymer electrolyte to solidify at least partially to form a second electrode assembly;
  n) positioning the fourth solid polymer electrolyte layer to be in ionic communication with the second solid polymer electrolyte layer.

28. The method of claim 27 wherein after step (m) the second polymer electrolyte and the fourth polymer electrolyte are allowed to solidify completely.

29. The method of claim 27 wherein step (m) comprises pressing and optionally heating the fourth solid polymer electrolyte layer to the second solid polymer electrolyte layer.

30. The method of claim 27 further comprising in step (i): forming the slurry into a second thin film on a second current collector.

31. A method of making a battery cell, comprising the steps of:
  making a first electrode assembly, comprising the steps of:
    a) mixing together first electrode active material and a liquefied first polymer electrolyte to make a slurry;
    b) forming the slurry into a first thin film electrode;
    c) preparing a liquefied second polymer electrolyte adapted to wet the first thin film electrode;
    d) applying the liquefied second polymer electrolyte onto the first thin film electrode to form a liquefied second polymer electrolyte layer on the first thin film electrode; and
    e) allowing the liquefied second polymer electrolyte to solidify at least partially, thereby forming a first electrode assembly;
    wherein no additional binder is used to form the first electrode assembly;

making a second electrode assembly, comprising the steps of:
- f) mixing together second electrode active material and a liquefied third polymer electrolyte to make a slurry;
- g) forming the slurry into a second thin film electrode;
- h) preparing a liquefied fourth polymer electrolyte adapted to wet the second thin film electrode;
- i) applying the liquefied fourth polymer electrolyte onto the second thin film electrode to form a liquefied fourth polymer electrolyte layer on the second thin film electrode; and
- j) allowing the liquefied fourth polymer electrolyte to solidify at least partially, thereby forming a second electrode assembly;
    - wherein no additional binder is to form the second electrode assembly; and positioning the fourth solid polymer electrolyte layer to be in ionic communication with the second solid polymer electrolyte layer.

32. The method of claim 31 wherein the first polymer electrolyte, the second polymer electrolyte, the third polymer electrolyte, and the fourth polymer electrolyte is each selected independently from the group consisting of optionally cross-linked polymers: polyethylene oxide, polysulfone, polyacrylonitrile, siloxane, polyether, polyamine, linear copolymers containing ethers or amines, ethylene carbonate, Nafion®, polysiloxane grafted with small molecules or oligomers that include polyethers and/or alkylcarbonates, and combinations thereof.

* * * * *